United States Patent
Hirst

(10) Patent No.: US 10,228,901 B1
(45) Date of Patent: Mar. 12, 2019

(54) DYNAMICALLY RENDERED MUSIC IN THE CLOUD

(71) Applicant: Amazon Technologies, Inc., Seattle, WA (US)

(72) Inventor: Alistair Robert Hirst, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/716,915

(22) Filed: Sep. 27, 2017

(51) Int. Cl.
  *G06F 3/16* (2006.01)
  *A63F 13/352* (2014.01)
  *A63F 13/40* (2014.01)
  *A63F 13/335* (2014.01)
  *A63F 13/424* (2014.01)

(52) U.S. Cl.
  CPC ........... *G06F 3/165* (2013.01); *A63F 13/335* (2014.09); *A63F 13/352* (2014.09); *A63F 13/40* (2014.09); *A63F 13/424* (2014.09)

(58) Field of Classification Search
  CPC .............. A63F 13/60; A63F 2300/6063; A63F 2300/407; A63F 13/00; G06F 3/667; G07F 17/3202; G07F 17/32; G07F 17/3223; G07F 17/3227; G07F 17/3225
  USPC ............................. 700/94; 463/16, 25, 20, 42
  See application file for complete search history.

(56) References Cited

U.S. PATENT DOCUMENTS

| | | | |
|---|---|---|---|
| 2006/0073881 A1* | 4/2006 | Pryzby ................... | G07F 17/32 463/20 |
| 2011/0256929 A1* | 10/2011 | Dubrofsky .............. | A63F 13/10 463/37 |
| 2016/0063809 A1* | 3/2016 | Decker ............... | G07F 17/3202 463/16 |
| 2016/0317933 A1* | 11/2016 | Shoshan ............... | A63F 13/422 |

* cited by examiner

*Primary Examiner* — Melur Ramakrishnaiah
(74) *Attorney, Agent, or Firm* — Lowenstein Sandler LLP

(57) ABSTRACT

A cloud audio recording engine running on a server computer receives one or more game parameters from a game application. The one or more game parameters correspond to one or more events occurring within the game application. The cloud audio recording engine controls at least one music parameter of one or more music tracks of a musical composition according to the one or more game parameters in a resulting audio mix and delivers a data stream comprising the audio mix to the game application, wherein the audio mix is to be used in conjunction with the one or more events.

19 Claims, 6 Drawing Sheets

DYNAMICALLY RENDERED MUSIC IN THE CLOUD

BACKGROUND

Cloud computing defines a model for enabling ubiquitous, convenient, on-demand network access to a shared pool of configurable computing resources (e.g., networks, servers, storage, applications, services) that can be rapidly provisioned and released with minimal management effort or service provider interaction. Certain characteristics of the cloud computing model include on demand self-service, broad network access, resource pooling, rapid elasticity, and measured service. Cloud computing can include several service models, including Software as a Service (SaaS), Platform as a Service (PaaS), and Infrastructure as a Service (IaaS). The cloud computing model may be implemented according to one of the several deployment models, including private cloud, community cloud, public cloud, or hybrid cloud.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Embodiments are described for dynamically rendered music in the cloud. Many video games wish to have dynamic music that adapts to events occurring during the course of game play. Certain games render the music at runtime using sound chips in game consoles or sound cards in personal computers or other computing devices. The quality of the resulting audio, however, is poor because the built in sounds are simple waveforms or low resolution samples of instruments. The advent of CD-ROM based games allowed music to be recorded in studios, using real instruments and studio production techniques. The tradeoff in improved sound quality is an inability to change the music to reflect events occurring in the game. Other games attempt to play chunks of digital audio and then rearrange and layer them in a simple way to allow for dynamic changes. The large chunks, however, only allow for a rather large granularity. Modern computers can do a good job of emulating entire orchestras by using massive sample sets of individual instruments recorded one note at a time, with multiple articulations and high quality reverberation and effects. These data sets are so large, however, that they likely uses the entire storage capacity of the game machine. Thus, it may not be practical to do this on a computer or console playing the game because of the other resource demands of the game, (e.g., graphics).

Figure 1:
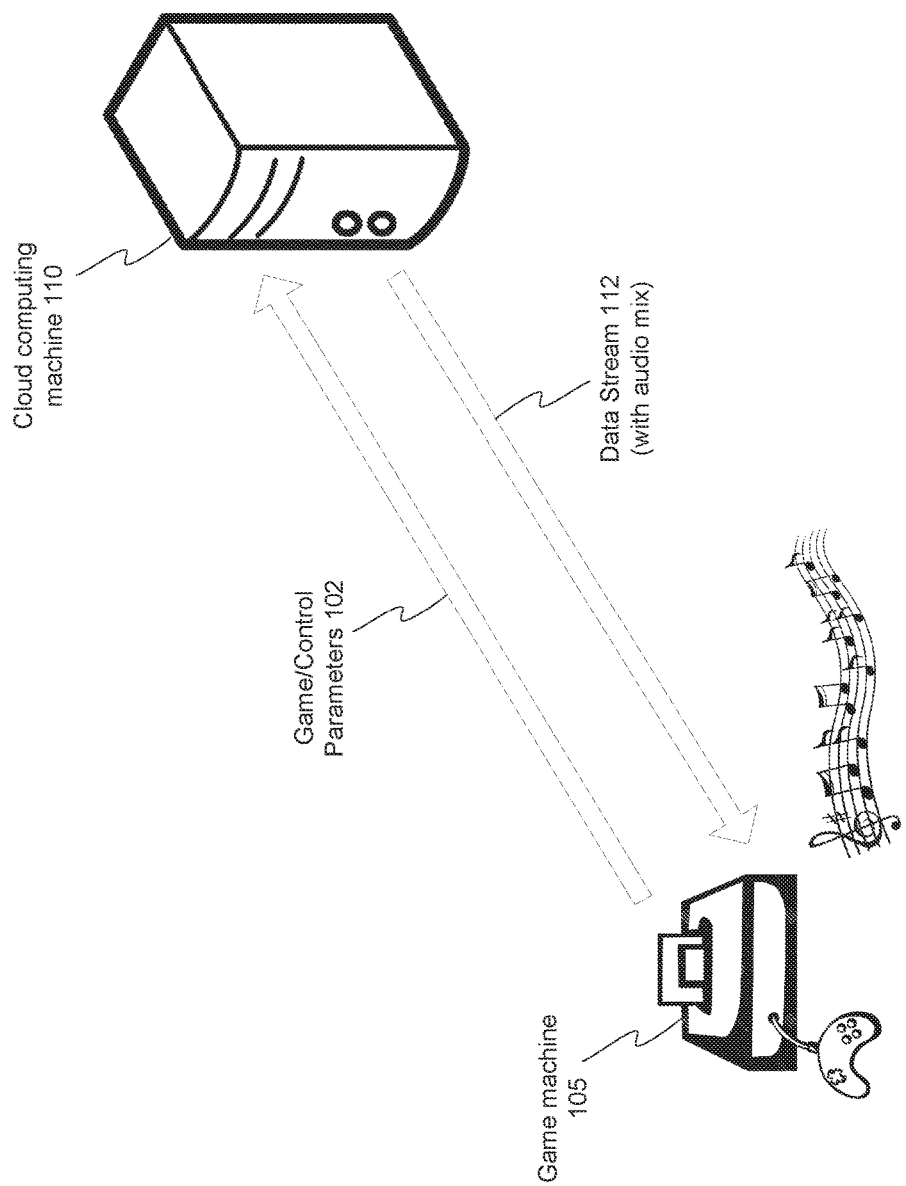
FIG. 1 is a block diagram illustrating dynamically rendered music in the cloud, according to an embodiment.

In the embodiments described herein and as illustrated in FIG. 1, to address the issues outlined above, the game can run locally on a game machine 105 (e.g., console, personal computer, mobile device), while the music is dynamically rendered on a remote cloud computing machine 110. In one embodiment, a game audio engine running on the game machine 105 can send game parameters 102 communicating game states, parameters, and changes to the cloud computing machine 110, which may be dedicated to dynamically rendering the music for the game. In the cloud computing environment, available storage may be sufficient to allow for use of a large set of individual tracks of a digital audio recording. In response to the information received from the game machine 105, a cloud audio rendering engine on cloud computing machine 110 can select one or more of those individual tracks, control at least one music parameter of the tracks (e.g., an output level of the tracks in the audio mix, a digital effect applied to the tracks, or a performance characteristic of the tracks) according to the received game parameters and deliver the audio mix in a data stream 112. Thus, an entire composition can be stored remotely in track form, which can be configured and mixed in real time in response to events occurring during the execution of the game. The data stream 112 can then be streamed to the game machine 105 over a network for playback to fit what is happening in the game execution. This approach offloads the music rendering from the game machine 105, allowing for highly dynamic music, which is also much higher quality and more responsive than would be available if it was rendered directly on the game machine 105 itself. Additional details regarding dynamically rendering music in the cloud are provided below with respect to FIGS. 2-6.

Figure 2:
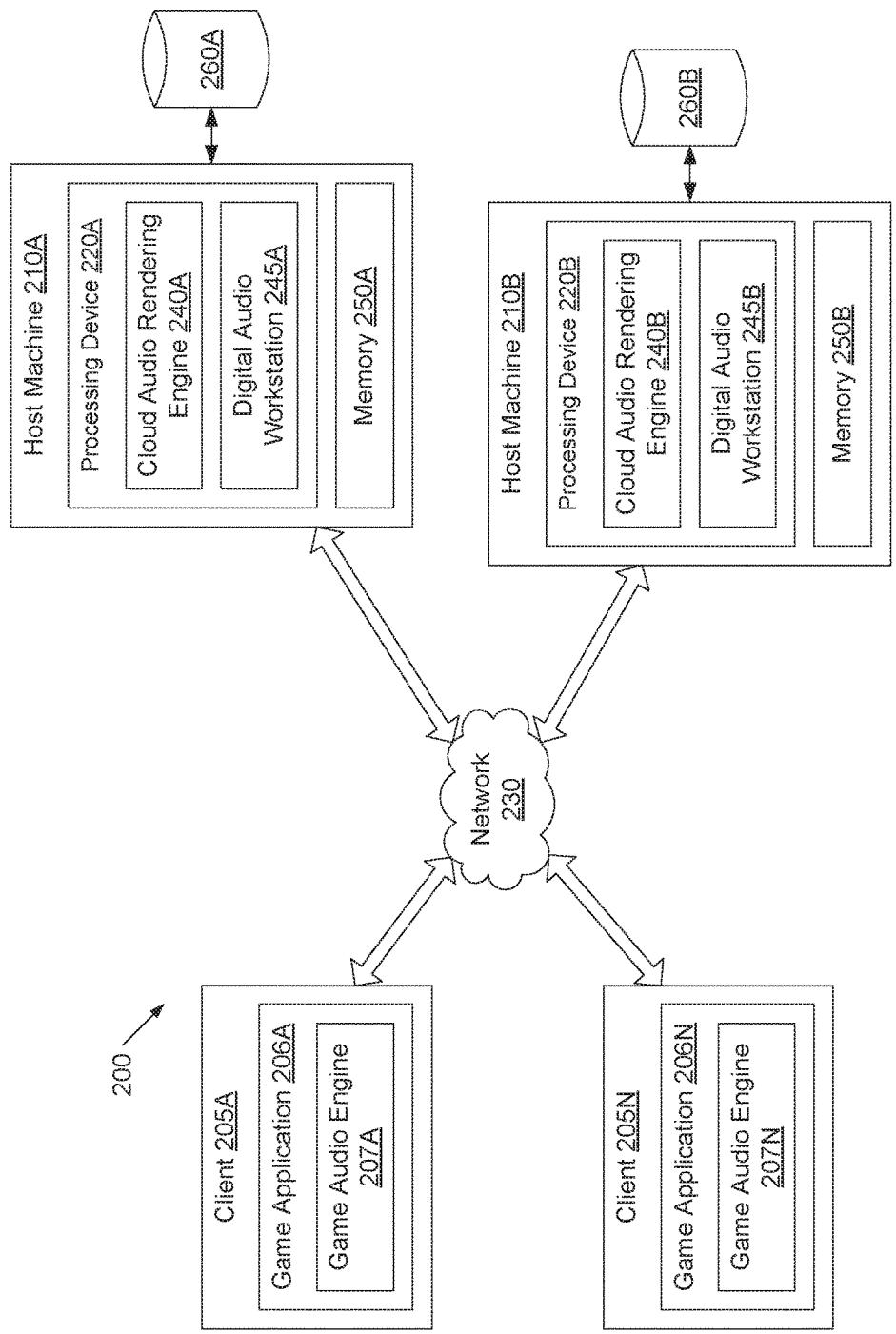
FIG. 2 is a block diagram of an exemplary network architecture, in which embodiments of the present disclosure may operate.

FIG. 2 is a block diagram of an exemplary network architecture 200, in which embodiments of the present disclosure may operate. In one embodiment, the network architecture 200 includes one or more cloud computing devices, such as host machines 210A-210B forming a computing cluster, which may be employed to provide cloud computing services to one or more gaming machines, such as client devices 205A-205N. The client devices 205A-205N may communicate with host machines 210A-210B via one or more networks 230. Client devices 205A-205N are representative of any number of clients which may utilize host machines 210A-210B for storing and accessing data in network architecture 200. Client devices 205A-205N are representative of any number of stationary or mobile computers such as desktop personal computers (PCs), servers, server farms, workstations, laptops, handheld computers, servers, personal digital assistants (PDAs), smart phones, game consoles and so forth. It is noted that some systems may include only a single client device, connected directly or remotely, to host machines 210A-210B.

In one embodiment, each of client devices 205A-205N includes a game application 206A-206N and a game audio engine 207A-207N. Each game application 206A-206N may be a computer application program that involves interaction with a user interface to generate visual and audio feedback on a display device such as a TV screen, computer monitor, etc. Each game audio engine 207A-207N may be configured to capture game parameters corresponding to one or more events occurring within the corresponding game application 206A-206N. During gameplay of game application 206A-

206N, an event may include the occurrence of any action or happening that warrants a change in a musical component of the game's sound effects. Some examples of events, which should not be construed as limiting, include the movement of a character, the appearance of an enemy, the entering of a new area/world, etc. In one embodiment, game audio engine 207A-207N transmits the game parameters representing the occurrence of an event to one of host machines 210A-210B via network 230.

In alternative embodiments, the number and type of client devices, host machines, and data storage devices is not limited to those shown in FIG. 2. At various times one or more clients may operate offline. In addition, during operation, individual client device connection types may change as users connect, disconnect, and reconnect to network architecture 200. Further, the systems and methods described herein may be applied to directly attached computing systems or network attached computing systems and may include a host operating system configured to perform one or more aspects of the described methods. Numerous such alternatives are possible and are contemplated.

In one embodiment, network 230 may utilize a variety of techniques including wireless connections, direct local area network (LAN) connections, wide area network (WAN) connections such as the Internet, a router, storage area network, Ethernet, and others. Network 230 may comprise one or more LANs that may also be wireless. Network 230 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 230. The network 230 may interface with a set of communications protocols used for the Internet such as the Transmission Control Protocol (TCP) and the Internet Protocol (IP), or TCP/IP.

In one embodiment, each host machine 210A-210B may be associated with one or more data storage devices 260A-260B. Examples of data storage devices include solid-state drives (SSDs), flash memory, magnetic or optical disks, tape drives, RAID arrays, EEPROM devices, storage area networks, network-attached storage, and/or any other devices capable of storing data.

Host machines 210A-210B may each include one or more processing devices 220A-220B, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) 250A-250B and a storage device 260A-260B. Each of processing devices 220A-220B may execute a corresponding instance of a cloud audio rendering engine 240 (i.e., 240A-240B). In one embodiment, cloud audio rendering engine 240A-240B receives the game parameters from game audio engine 207A-207N via network 230 and dynamically generates an audio component for the game application 206A-206N in response to the game parameters. In one embodiment, cloud audio rendering engine 240A-240B controls at least one music parameter of one or more music tracks of a musical composition stored in data storage devices 260A-260B according to the one or more game parameters in a resulting audio mix.

In one embodiment, cloud audio rendering engine 240A-240B utilizes a digital audio workstation (DAW) 245A-245B to control the music parameters and generate the one or more mixed music tracks. For example, cloud audio rendering engine 240A-240B may send musical instrument digital interface (MIDI) commands to digital audio workstation 245A-245B indicating which tracks are to be mixed, to control an output level of each track in the mix, apply digital effects to the tracks and control any number of performance characteristics, such as volume, frequency, tempo, key, etc. associated with each track. Digital audio workstation 245A-245B can be a module configured for recording, editing, producing, and mixing audio tracks or samples. In one embodiment, digital audio workstation 245A-245B can combine multiple music tracks into a single track or produced piece by blending the multiple tracks together using various processes such as equalization, compression, reverberation, levels setting, stereo panning, effects, etc. Digital audio workstation 245A-245B may include, for example, Ableton® Live™, Logic Pro®, Pro Tools®, or some other digital audio workstation. Depending on the embodiment, each host machine 210A-210B may contain a separate instance of the cloud audio recording engine 240A-240B and digital audio workstation 245A-245B. In other embodiments, however, each host machine 210A-210B may share a single instance of the cloud audio recording engine 240A-240B and/or the digital audio workstation 245A-245B, which may be located on one of host machines 210A-210B or on some other node in network architecture 200.

After the tracks are mixed and at least one music parameter is controlled by digital audio workstation 245A-245B, cloud audio rendering engine 240A-240B can then deliver a data stream with the resulting audio mix back to game application 206A-206N to be used in conjunction with the event occurring during the gameplay of game application 206A-206N. In this manner, an entire composition can be stored remotely in track form on data storage devices 260A-260B, which can be configured and mixed in real time in response to events occurring during the execution of the game application 206A-206N. The audio mix can then be streamed to the client device 205A-205N over network 230 for playback to fit what is happening in the execution of game application 206A-206N. In one embodiment, cloud audio rendering engine 240A-240B can provide the individual audio tracks, having the music parameters controlled according to the game parameters, directly to client device 205A-205N without first combining them into an audio mix. In one embodiment, cloud audio rendering engine 240A-240B can convert the audio mix to a digital audio file (e.g., by "bouncing" the one or more tracks) and provide the digital audio file to client device 205A-205N.

In another embodiment, client devices 205A-205N may include other applications in place of or in addition to game application 206A-206N. For example, client devices 205A-205N may include video applications, multimedia applications, virtual reality applications, augmented reality application or other types of applications. In one embodiment, cloud audio rendering engine 240A-240B can dynamically mix a number of individual music tracks in real time in response to events occurring during the execution of these other types of applications. For example, a video application may transmit game parameters corresponding to events happening in a movie being played. Cloud audio rendering engine 240A-240B can similarly use that game parameters to dynamically generate an audio mix and provide that mix, or a corresponding audio file, to the video application for playing during the movie. Thus, the techniques described herein need not be limited to use with game applications and can be equally applicable to any other type of application with utilizes a musical audio component.

Figure 3:
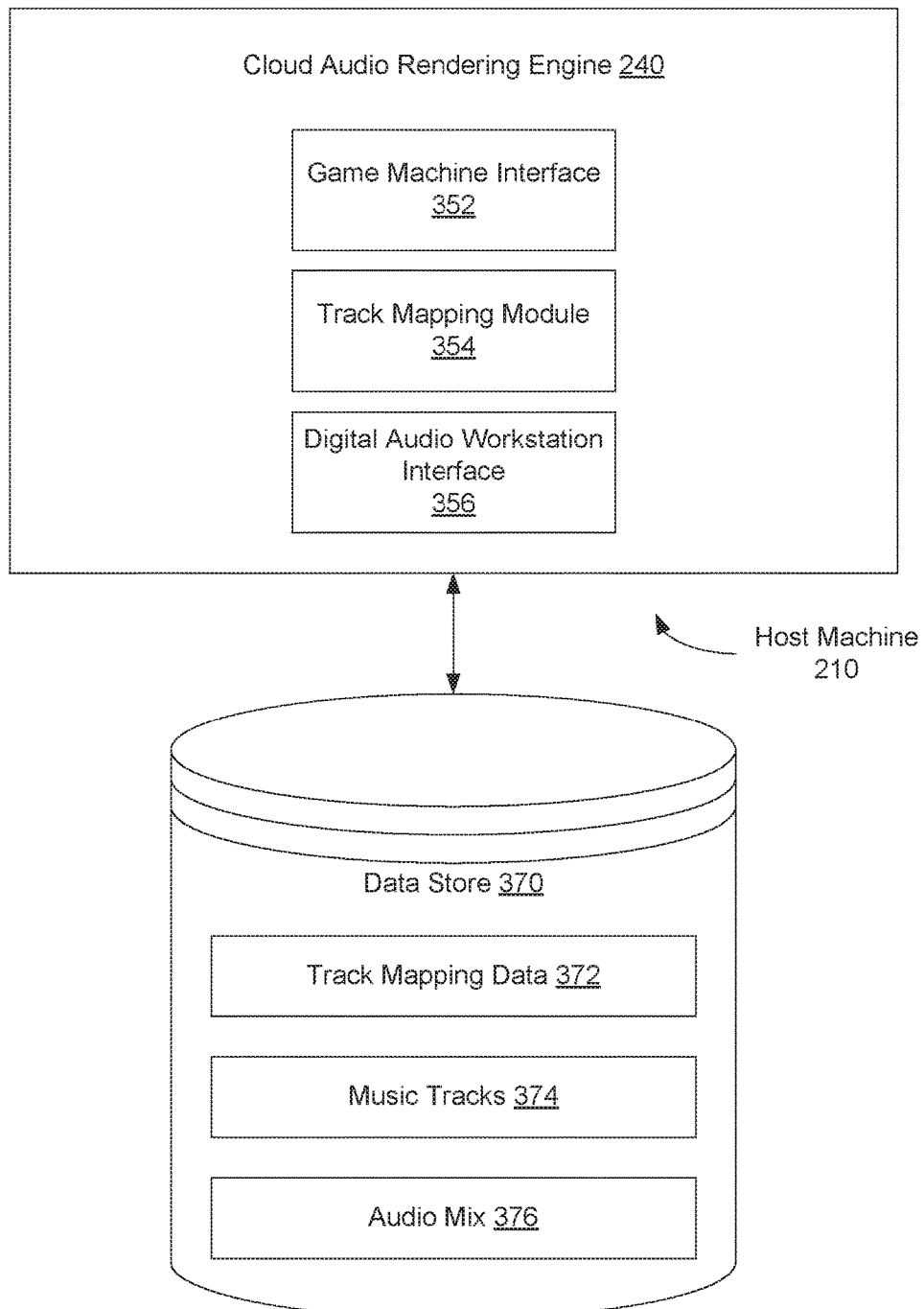
FIG. 3 is a block diagram illustrating a cloud audio rendering engine, according to an embodiment.

FIG. 3 is a block diagram illustrating a cloud audio rendering engine 240, according to an embodiment. In one embodiment, cloud audio rendering engine 240 includes game machine interface 352, track mapping module 354, and digital audio workstation interface 356. This arrangement of modules and components may be a logical separation, and in other embodiments, these modules or other components can be combined together or separated in further components, according to a particular implementation. In one embodiment, data store 370 is connected to cloud audio rendering engine 240 and includes track mapping data 372, individual music tracks 374 and audio mix 376. In one implementation, one physical node (e.g., host machine 210) may include both cloud audio rendering engine 240 and data store 370. In another embodiment, data store 370 may be external to the physical node and may be connected over a network or other connection. In other implementations, the physical node and cloud audio rendering engine 240 may include different and/or additional components and applications which are not shown to simplify the description. Data store 370 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, game machine interface 352 manages communication between cloud audio rendering engine 240 and game audio engine 207A-207N or other components of game application 206A-206N or game machine (e.g., client device 205A-205N). In one embodiment, game machine interface 352 receives game parameters from game application 206A-206N which corresponds to one or more events occurring within the game application 206A-206N. For example, during gameplay of game application 206A-206N, an event may include the occurrence of any action or happening that warrants a change in a musical component of the game's sound effects. Events may include, for example, the movement of a character, the appearance of an enemy, the entering of a new area/world, etc. In one embodiment, the game parameters comprises MIDI data representing information associated with the event. For example, the information may include an indication of the area/world where the character is located and an indication that a particular type of enemy is present in that area/world, a distance between the character and the enemy, a rate of change in that distance, an indication of whether the enemy is in an attack mode, or any other relevant information that can be used to determine the musical audio component to be played in the game. Once cloud audio rendering engine 240 causes one or more music tracks 374 of a musical composition to be mixed according to the received game parameters, game machine interface 352 can deliver audio mix 376 to game application 206A-206N which is representative of the one or more mixed music tracks and is to be used in conjunction with the one or more events occurring during gameplay of the game application 206A-206N. In one embodiment, game audio engine 207A-207N can receive the audio mix 376 in the data stream from game machine interface 352 via network 230 as an external audio input and can cause playback of the audio mix 376 during game play in response to the occurring events.

In one embodiment, track mapping module 354 selects one or more music tracks or samples from a plurality of music tracks 374 associated with a musical composition to be mixed together into an audio mix. In one embodiment, the music tracks 374, also referred to as audio tracks, include an individual component or channel stored separately from the rest of the composition. For example, each music track 374 may correspond to a sample of a different instrument playing a different portion of the composition (e.g., a combination of one or more individual notes played by the particular instrument). In one embodiment, track mapping module 354 utilizes the game parameters received by game machine interface 352 and track mapping data 372 stored in data store 370. In one embodiment, track mapping data 372 is provided by a composer, music supervisor, or other source and is used to define what musical component is to be generated for a particular event occurring in game application 206A-206N. For example, track mapping data 372 may contain mapping data between the information in the received game parameters and the music tracks 374 and various characteristics of those tracks, such as volume, frequency, tempo, key, etc. Thus, depending on the game parameters received by game machine interface 352, track mapping module 354 can access track mapping data 372, identify one or more entries in track mapping data 372 corresponding to the particular combination of information contained in the game parameters, and determine the corresponding combination of music tracks 374 and associated music parameters from those one or more entries. In one embodiment, track mapping module 354 can provide instructions to digital audio workstation interface 356 based on the information determined from track mapping data 372.

In one embodiment, digital audio workstation interface 356 manages communication between cloud audio rendering engine 240 and digital audio workstation 245A-245B. In one embodiment, digital audio workstation interface 356 sends MIDI commands based on the track mapping data 372 identified by track mapping module 354 to one of digital audio workstations 245A-245B. By sending these MIDI commands, digital audio workstation interface 356 can cause digital audio workstation 245A-245B to mix one or more music tracks 374 and control one or more music parameters of those tracks according to the game parameters to generate an audio mix of one or more mixed music tracks. In one embodiment, digital audio workstation 245A-245B can combine multiple music tracks 374 into a single track by blending the multiple tracks together using various processes such as equalization, compression, reverberation, levels setting, stereo panning, effects, etc. In addition, digital audio workstation 245A-245B can convert the one or more mixed music tracks into a digital audio file (e.g., "bouncing"). In one embodiment, digital audio workstation interface 356 receives the audio mix 376 back from digital audio workstation 245A-245B and stores it in data store 370. Digital audio workstation interface 356 can further provide the audio mix 376 to game machine interface 352 for delivery to one of game applications 206A-206N running on one of client devices 205A-205N.

In one embodiment, digital audio workstation interface 356 further implements an artificial intelligence or machine learning component to further improve the audio mix generated from the one or more music tracks. In one embodiment, digital audio workstation interface 356 uses machine learning to learn, from the changes and events occurring in the execution of game application 206A-206N (as represented in the received game parameters), what changes occur in the resulting audio mix generated by digital audio workstation 245A-245B. Digital audio workstation interface 356 may use one of various unsupervised or supervised machine learning techniques, such as a cluster analysis algorithm, a self-organizing map, linear regression, logistic regression, a decision tree, support vector machine (SVM), Naive Bayes, K-nearest neighbor (KNN), K-Means clustering, Random Forest, Dimensionality Reduction Algorithms, Gradient Boost & Adaboost, etc., to learn how the events of the gameplay affect the resulting audio mix. As a result, digital audio workstation interface 356 can provide more accurate MIDI commands to digital audio workstation 245A-245B.

In one embodiment, digital audio workstation interface 356 applies one or more supervised machine learning techniques to train a machine learning model to mix multiple tracks into an automated piece. Examples of supervised machine learning models that may be trained include an artificial neural network, a convolutional network, a support vector machine, and so on. A training dataset used to train the machine learning model may include events in video games, movies, or other media and/or applications and pieces that accompanied those events. The training dataset may include composed pieces that were manually composed for many different games or movies for example as well as the events or scenes associated with those games or movies. The composed pieces may represent the labels or output that the machine learning model is to generate and the events and/or scenes may represent the inputs for the machine learning model. Once trained, the machine learning model may select and mix tracks to produce a piece or single combined track based on one or more input events and/or scenes. Thus, the trained machine learning model may be trained to automatically produce musical pieces based on input events and/or scenes in an embodiment.

Figure 4:
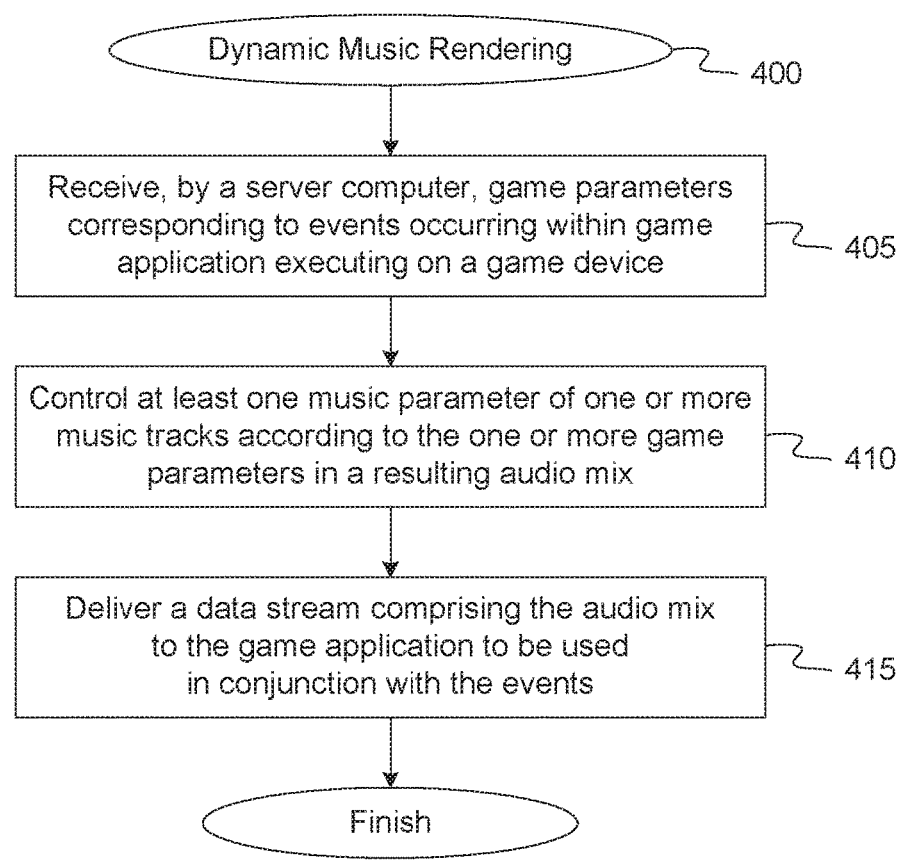
FIG. 4 is a flow diagram illustrating method of dynamically rendering music in the cloud, according to an embodiment.

FIG. 4 is a flow diagram illustrating method of dynamically rendering music in the cloud, according to an embodiment. The method 400 may be performed by processing logic that comprises hardware (e.g., circuitry, dedicated logic, programmable logic, microcode, etc.), software, firmware, or a combination thereof. The processing logic is configured to dynamically generate an audio mix on a cloud computing machine by causing one or more music tracks of a musical composition to be mixed according to received game parameters corresponding to one or more events occurring during execution of a game application on a remote game machine. In one embodiment, method 400 may be performed by cloud audio rendering engine 240, as shown in FIGS. 2 and 3.

Referring to FIG. 4, at block 405, method 400 receives, by a server computer (e.g., one of host machines 210A-210B), game parameters from a game application 206A-206N running on a game machine (e.g., one of client devices 205A-205N). In one embodiment, game machine interface 352 receives game parameters from game application 206A-206N which corresponds to one or more events occurring within the game application 206A-206N. The game parameters may include information associated with the events.

At block 410, method 400 controls at least one music parameter of one or more music tracks of a musical composition according to the one or more game parameters in a resulting audio mix. In one embodiment, digital audio workstation interface 356 sends MIDI commands based on track mapping data 372 identified by track mapping module 354 to one of digital audio workstations 245A-245B. Digital audio workstations 245A-245B may include, for example, Ableton® Live™, Logic Pro®, Pro Tools®, or some other digital audio workstation. In one embodiment, digital audio workstation 245A-245B can combine multiple music tracks 374 into a one or more mixed music tracks and can optionally convert the one or more mixed music tracks into an audio mix 376. In one embodiment, controlling the at least one music parameter includes controlling at least one of an output level of the one or more music tracks in the audio mix, a digital effect applied to the one or more music tracks, or a performance characteristic of the one or more music tracks At block 415, method 400 delivers a data stream comprising the audio mix 376 to the game application 206A-206N wherein the audio mix is to be used in conjunction with the one or more events occurring in the gameplay of the game application 206A-206N. In one embodiment, game machine interface 352 sends the data stream comprising audio mix 376 to game audio engine 207A-207N via network 230. In this manner, the music rendering process is removed from the computing device where the game is executing to free up resources on that computing device. In addition, the process described herein allows for the availability of highly dynamic music, which can be mixed in real time according to events occurring during game play and which is also of much higher quality than if it was rendered directly on the game machine itself.

Figure 5:
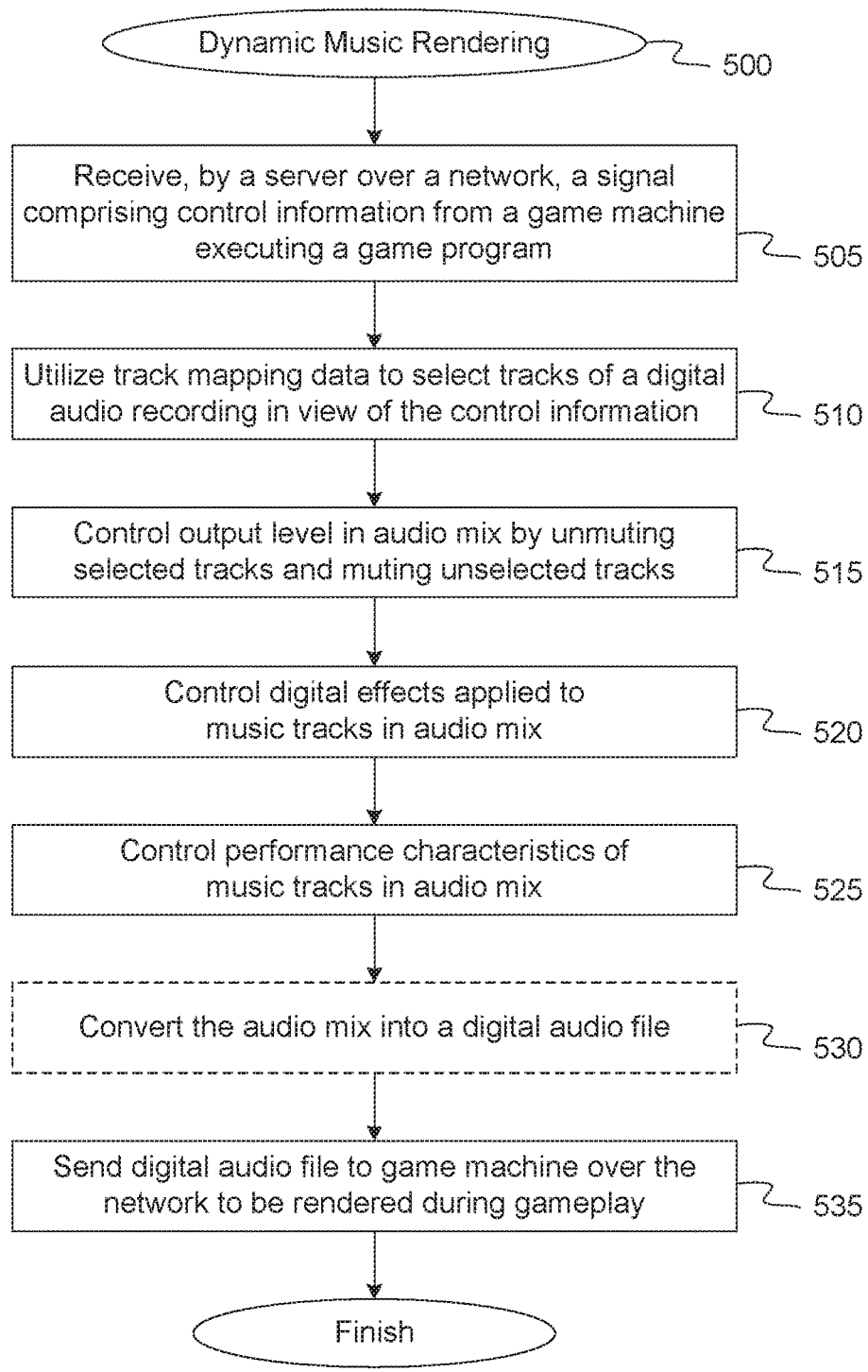
FIG. 5 is a flow diagram illustrating method of dynamically rendering music in the cloud, according to an embodiment.

FIG. 5 is a flow diagram illustrating method of dynamically rendering music in the cloud, according to an embodiment. The method 500 may be performed by processing logic that comprises hardware (e.g., circuitry, dedicated logic, programmable logic, microcode, etc.), software, firmware, or a combination thereof. The processing logic is configured to dynamically generate an audio mix on a cloud computing machine by causing one or more music tracks of a musical composition to be mixed according to received game parameters corresponding to one or more events occurring during execution of a game application on a remote game machine. In one embodiment, method 500 may be performed by cloud audio rendering engine 240, as shown in FIGS. 2 and 3.

Referring to FIG. 5, at block 505, method 500 receives, by a first machine (e.g., one of host machines 210A-210B) over a network 230, a signal from a second machine (e.g., one of client devices 205A-205N) executing a game program 206A-206N, the signal comprising game parameters associated with execution of the game program 206A-206N. In one embodiment, game machine interface 352 receives game parameters from game application 206A-206N, and the game parameters may include information associated with events occurring during execution of the game program 206A-206N.

At block 510, method 500 utilizes track mapping data 372 to select one or more individual tracks 374 of a digital audio recording in view of the game parameters. Depending on the game parameters received by game machine interface 352, track mapping module 354 can access track mapping data 372, identify one or more entries in track mapping data 372 corresponding to the particular combination of information contained in the game parameters, and determine the corresponding combination of music tracks 374 and associated characteristics from those one or more entries in track mapping data 372.

At block 515, method 500 combines the one or more individual tracks into an audio mix and controls output levels of the tracks in the mix. In one embodiment, digital audio workstation interface 356 sends MIDI commands based on the track mapping data 372 identified by track mapping module 354 at block 510 to one of digital audio workstations 245A-245B. In one embodiment, digital audio workstation 245A-245B can combine the multiple music tracks 374 into a one or more mixed music tracks. In one embodiment, the output level can include a number of level controls, such as an individual channel fader, subgroup master fader, master fader, monitor volume control, etc. Digital audio workstation 245A-245B can control any one of these output levels for each individual track or sample in the mix.

At block 520, method 500 controls one or more digital effects applied to the music tracks. The MIDI commands sent by digital audio workstation interface 356 can cause digital audio workstation 245A-245B to control the effects according to the received game parameters. The digital effects can include any unit that has an effect upon the output signal. Examples could include equalization, panning, dynamic processing (compressors, gates, expanders, and limiters), reverb and delays, as well as automation techniques.

At block 525, method 500 controls at least one performance characteristic of the one or more music tracks. The MIDI commands sent by digital audio workstation interface 356 can cause digital audio workstation 245A-245B to control the performance characteristics according to the received game parameters. Controlling the performance characteristic of the one or more music tracks can include adjusting one or more of a volume, frequency, tempo, key, velocity or any other characteristic affecting the one or more music tracks in the audio mix.

At block 530, method 500 optionally converts the audio mix into a digital audio file, and at block 535, method 500 sends a data stream comprising the audio mix (and optionally the digital audio file) to the second machine (e.g., one of client devices 205A-205N) to be rendered during execution of the game program 206A-206N. In one embodiment, game machine interface 352 sends the audio mix 376 to game audio engine 207A-207N via network 230.

Figure 6:
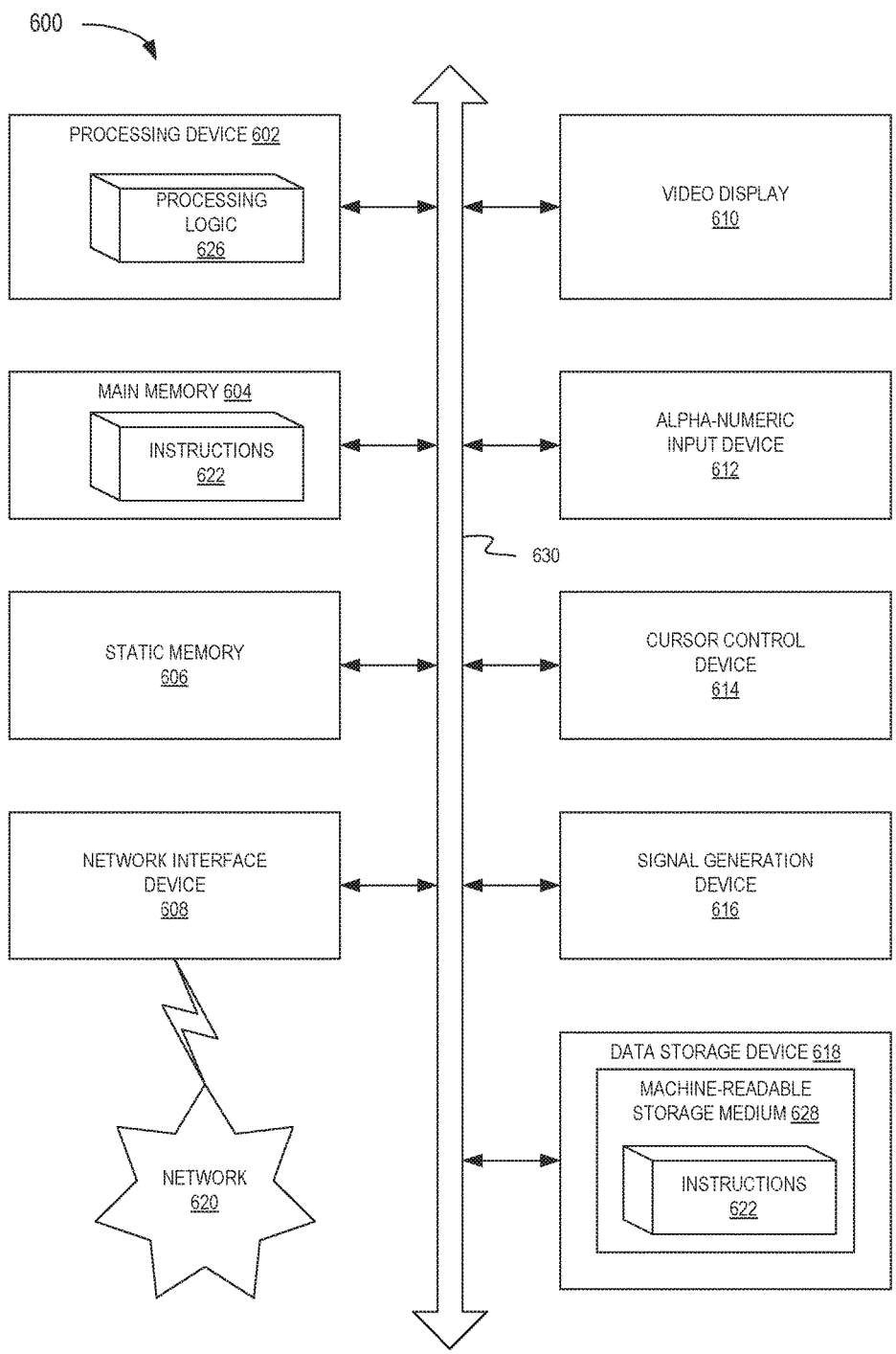
FIG. 6 is a block diagram illustrating one embodiment of a computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a game console, a web appliance, a server, a host machine, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a computing device, such as host machines 210A-210B or client devices 205A-205N.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 628, on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-accessible storage media. The instructions 622 may further be transmitted or received over a network 620 via the network interface device 608.

The machine-readable storage medium 628 may also be used to store instructions for dynamically rendering music in the cloud, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a server computer, one or more game parameters from a game application, wherein the one or more game parameters correspond to one or more events occurring within the game application;
   controlling at least one music parameter of one or more music tracks of a musical composition according to the one or more game parameters;
   generating an audio mix comprising the one or more music tracks; and
   delivering a data stream comprising the audio mix to the game application, wherein the audio mix is to be used in conjunction with the one or more events.

2. The method of claim 1, wherein controlling the at least one music parameter comprises controlling at least one of an output level of the one or more music tracks in the audio mix, a digital effect applied to the one or more music tracks, or a performance characteristic of the one or more music tracks.

3. The method of claim 2, wherein controlling the performance characteristic of the one or more music tracks comprises adjusting one or more of a volume, frequency, tempo or key of the one or more music tracks in the audio mix according to the one or more game parameters.

4. The method of claim 1, wherein a game machine executes the game application, and wherein the game machine is connected to the server computer over a network.

5. The method of claim 1, wherein the musical composition comprises a plurality of music tracks, and wherein controlling the at least one music parameter of the one or more music tracks comprises:
   selecting the one or more music tracks from the plurality of music tracks, wherein the one or more music tracks are defined in track mapping data associated with the musical composition according to the one or more game parameters; and
   combining the one or more music tracks into the audio mix.

6. The method of claim 1, further comprising:
   converting the audio mix into a digital audio file.

7. A computing device comprising:
   one or more processors; and
   memory to store computer-executable instructions that, if executed, cause the one or more processors to:
      receive, over a network, a signal from a remote computing device executing a game program, the signal comprising one or more game parameters associated with execution of the game program;
      dynamically generate an audio mix from a plurality of individual music samples;
      control at least one music parameter of the plurality of individual music samples in response to the one or more game parameters; and
      transmit an audio data stream comprising the audio mix to the remote computing device over the network for playback.

8. The computing device of claim 7, wherein the plurality of samples is associated with a musical composition.

9. The computing device of claim 8, wherein to control the at least one music parameter, the one or more processors to control at least one of an output level of the plurality of music samples in the audio mix, a digital effect applied to the plurality of music samples, or a performance characteristic of the plurality of music samples.

10. The computing device of claim 9, wherein to control the at least one music parameter, the one or more processors to:
   select the plurality of individual music samples, wherein the plurality of individual music samples are defined in track mapping data associated with the musical composition according to the one or more game parameters; and
   combine the plurality of individual music samples into the audio mix.

11. The computing device of claim 9, wherein to control the performance characteristic of the one or more music tracks, the one or more processors to adjust one or more of a volume, frequency, tempo or key of the one or more of the plurality of music samples in the audio mix according to the one or more game parameters.

12. The computing device of claim 7, wherein the one or more processors further to:
   convert the audio mix into a digital audio file.

13. One or more non-transitory machine-readable storage mediums having stored therein instructions which, if performed by one or more processors, cause the one or more processors to:
   receive, by a first machine over a network, a signal from a second machine, the signal comprising one or more control parameters;
   select, by the first machine, one or more music tracks in view of the one or more control parameters;
   control at least one music parameter of the one or more music tracks according to the one or more control parameters;
   combine, by the first machine, the one or more music tracks into an audio mix; and
   send a data stream comprising the audio mix to the second machine over the network.

14. The one or more non-transitory machine-readable storage mediums of claim 13, wherein to control the at least one music parameter of the one or more music tracks, the one or more processors to control at least one of an output level of the one or more music tracks in the audio mix, a digital effect applied to the one or more music tracks, or a performance characteristic of the one or more music tracks.

15. The one or more non-transitory machine-readable storage mediums of claim 14, wherein to control the performance characteristic of the one or more music tracks, the one or more processors to adjust one or more of a volume, frequency, tempo or key of the one or more music tracks in the audio mix according to the one or more control parameters.

16. The one or more non-transitory machine-readable storage mediums of claim 13, wherein the one or more control parameters comprises musical instrument digital interface (MIDI) data.

17. The one or more non-transitory machine-readable storage mediums of claim 13, wherein the one or more individual tracks are associated with a digital audio composition.

18. The one or more non-transitory machine-readable storage mediums of claim 17, wherein to select the one or more music tracks, the one or more processors to utilize track mapping data associated with the digital audio composition and identify the one or more music tracks from the track mapping data according to the one or more control parameters.

19. The one or more non-transitory machine-readable storage mediums of claim 17, wherein to combine the one or more music tracks into the audio mix, the one or more processors to unmute the one or more music tracks that are selected and mute at least one other music track of the digital audio composition that is not selected.

* * * * *